United States Patent [19]

Lukey

[11] 4,158,451

[45] Jun. 19, 1979

[54] MOUNTING FRAME

[76] Inventor: Leonard F. Lukey, 6 Florence St., Mentone, Victoria, Australia, 3194

[21] Appl. No.: 850,284

[22] Filed: Nov. 9, 1977

[30] Foreign Application Priority Data

Nov. 10, 1976 [AU] Australia .............................. PC8083
Aug. 12, 1977 [AU] Australia .............................. PD1210

[51] Int. Cl.² .................................................. B60K 1/06
[52] U.S. Cl. ..................................... 248/479; 350/307
[58] Field of Search .............. 248/479, 475, 476, 480, 248/485, 486, 487; 350/307

[56] References Cited

U.S. PATENT DOCUMENTS

| 2,802,395 | 8/1957 | Madion | 248/480 |
| 2,969,715 | 1/1961 | Mosby | 248/486 X |
| 3,372,897 | 3/1968 | Lee | 248/480 |
| 3,415,481 | 12/1968 | Greenfield | 248/486 |
| 3,420,490 | 1/1969 | Malachowski | 248/486 |
| 3,501,122 | 3/1970 | Barker | 248/486 |
| 3,729,163 | 4/1973 | Cummins | 248/487 |
| 3,778,016 | 12/1973 | Gernhardt et al. | 248/475 R |
| 4,073,461 | 2/1978 | Lopez et al. | 248/475 R |

Primary Examiner—J. Franklin Foss
Attorney, Agent, or Firm—Lowe, King, Price & Becker

[57] ABSTRACT

The invention is a frame for releasably attaching an external rear-vision mirror to a vehicle and which comprises a substantially A-shaped upper frame and having at the open end thereof attachment means for releasably attaching the upper frame to a vehicle, a lower frame extending downwardly from the outer end of said upper frame and being securable to said vehicle, a link joining the upper frame to the lower frame at a point intermediate its length and being of variable length, said upper frame being adapted to securably and movably receive a mirror mounting.

6 Claims, 4 Drawing Figures

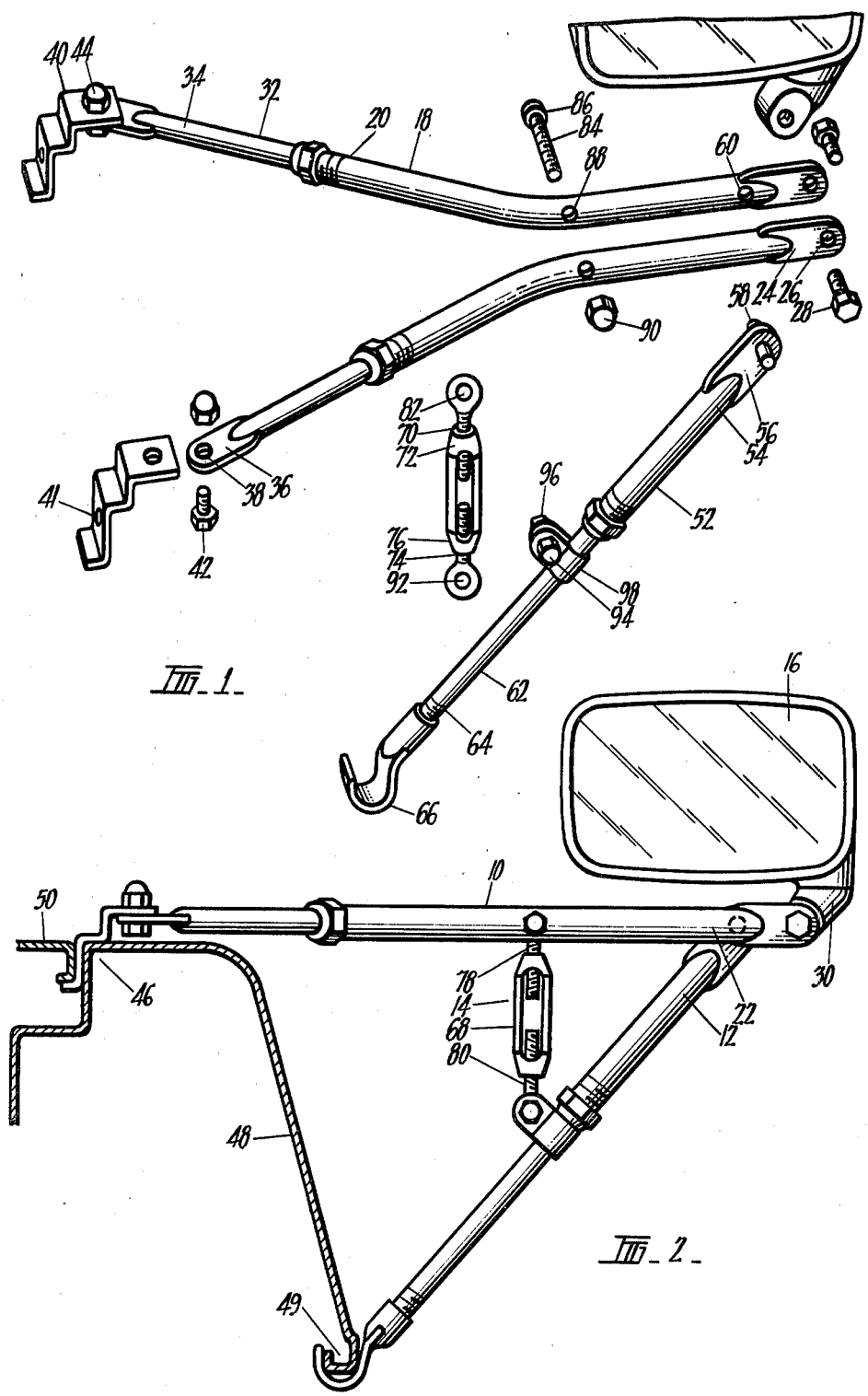

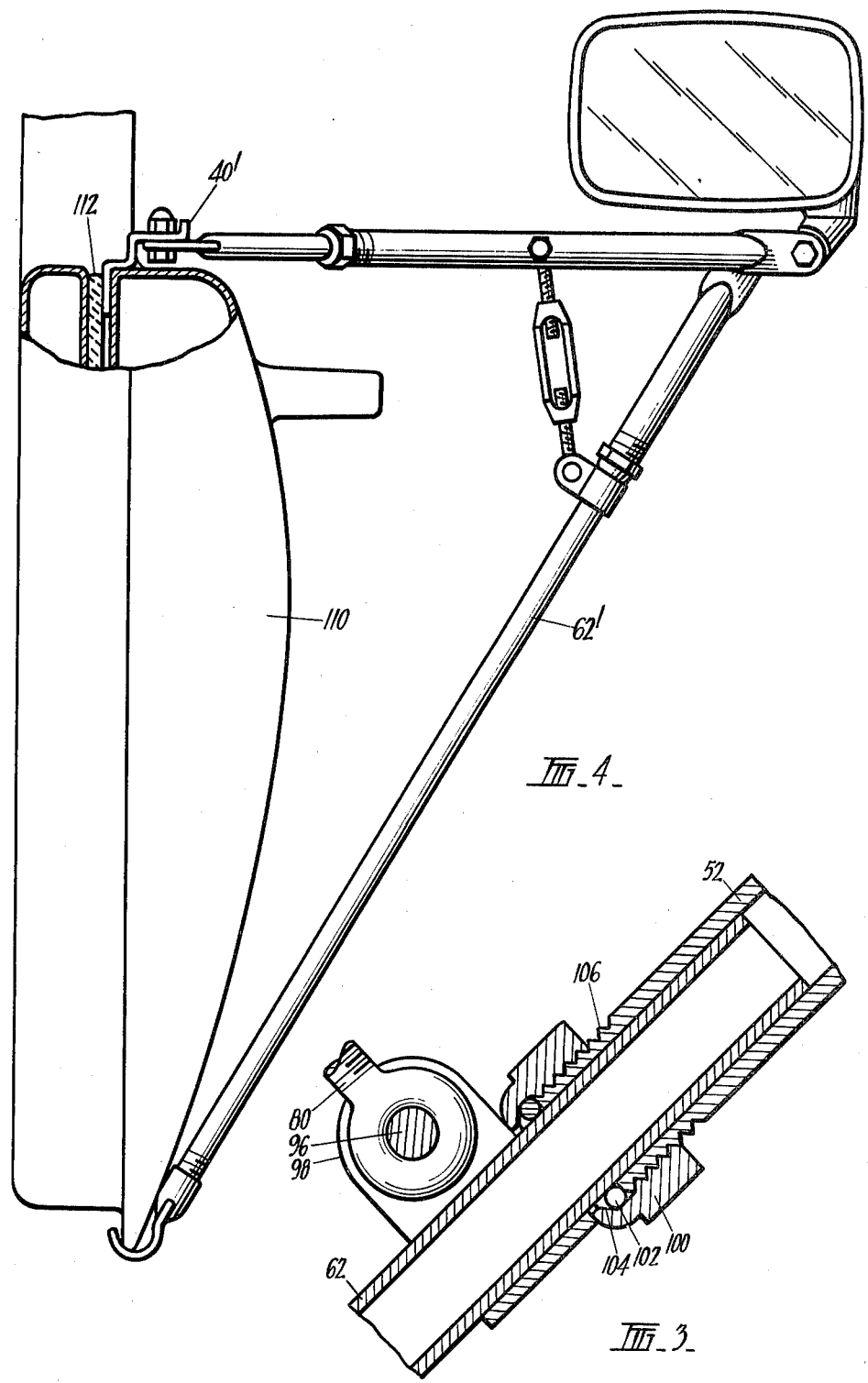

MOUNTING FRAME

This invention relates to a mounting frame and refers particularly, though not exclusively, to a frame for releasably attaching an external rear-vision mirror to a vehicle.

Over the past several years, there has been a large increase in the number of people who use "normal" motor vehicles for the towing of caravans and trailers, both for business and pleasure purposes. When this is done, the normally provided rear-vision mirrors on the vehicle are rendered useless due to the obstruction caused by the caravan or trailer. To overcome this, it has proved necessary to provide externally-mounted rear-vision mirrors which extend outwardly beyond the vehicle so that the driver of the vehicle can see behind the caravan or trailer. These mirrors are secured to the vehicle by frames which have hitherto been rather complex and large structures which extend completely across the bonnet of the vehicle or have been rather light-weight structures which are secured on to the front fenders of the vehicle. The large complex structures have had the inherent disadvantage that they are moved by movements of the bonnet, whereas the light-weight structures attached to the fenders have always had the inherent problem that they are very suspect to vibration and tend to fracture rather easily. Furthermore, the mirror itself is very easily knocked and either damaged or moved from its desired position.

It is therefore the principal object of the present invention to provide a mounting frame for releasably attaching an external rear-vision mirror to a vehicle and which is of solid construction and is easy to use.

A further object of the present invention is to provide a mounting frame for releasably attaching an external rear-vision mirror to a vehicle and which will allow the use of remote-controlled, mirror mechanisms.

With the above and other objects in mind the present invention provides a mounting frame comprising a substantially A-shaped upper frame and having at the open end thereof means for releasably attaching the upper frame to a vehicle, a lower frame extending downwardly from the point of said upper frame and being securable to said vehicle, a link joining the upper frame to the lower frame at a point intermediate its length and being of variable length, said upper frame being adapted to securably and movably receive a mirror mounting.

In order that the invention may be completely understood and readily put into practical effect there shall now be described a preferred construction of a mounting frame incorporating the features of the present invention, the description being by way of non-limitative example only and being with reference to the accompanying illustrative drawings. In the drawings:

FIG. 1 is an exploded front perspective view of the mounting frame;

FIG. 2 is an elevation view of the assembled mounting frame secured to a vehicle fender;

FIG. 3 is an enlarged vertical cross-section of the lower frame member of FIGS. 1 and 2; and FIG. 4 is an elevation view of the assembled mounting frame secured to a vehicle door.

The particular mounting frame has an upper frame member 10, a lower frame member 12, a linking member 14 and a mirror 16.

The upper frame member 10 is approximately A-shaped when viewed in plan and comprises two identically shaped hollow rods 18 in back-to-back relation. The rods 18 are bent outwardly at a location approximately mid-way along their length so that they flare away from each other towards their inner ends 20 and come together towards their outer ends 22. The outer ends 22 of rods 18 are provided with vertically oriented flattened portions 24 each having a hole 26 therethrough. These holes 26 are adapted to cooperate with bolts 28 to retain a mirror support bracket 30 in position to thus retain mirror 16.

The upper frame member 10 also has two end rods 32 which are sized such that they are a sliding fit within the inner ends 20 of rods 18. The inner ends 34 of rods 32 are provided with horizontally oriented flattened portions 36 each having a hole 38 therethrough. An end plate 40 is attached to each flattened portion 36 by means of a bolt 42 and nut 44, the bolt 42 and nut 44 allowing for relative movement of the plate 40 about the bolt 42. The plates 40 are adapted to fit around the upper inner edge 46 of a front fender 48 of a vehicle and under the bonnet 50 of the vehicle so as to hold the upper frame 10 in position relative to the vehicle.

The lower frame member 12 comprises a straight hollow rod 52 which is similar to rods 18 but approximately half the length. The rod 52 has an upper end 54 which has a vertically oriented flattened portion 56. Extending outwardly from each side of portion 56 are pivot pins 58 which are adapted to be received in corresponding pivot holes 60 in the outer ends 22 of rods 18. The lower frame member 12 also has a lower end rod 62 which is sized to be a sliding fit within straight rod 52. This lower rod 62 is similar to end rods 32 except that its inner end 64 is provided with a flattened hook portion 66 which is adapted to fit around the wheel arch 49 of the fender 48.

Connecting the upper frame member 10 and the lower frame member 12 is the link member 14. The link member 14 comprises a hollow, tube-like frame 68 having an opening 70 at the upper end 72 and an opening 74 at the lower end 76. The opening 70 is provided with an internal thread of right-hand configuration whereas opening 74 is provided with an internal thread of left-hand configuration. Two bolts are provided - an upper bolt 78 of right-hand thread and a lower bolt 80 of left-hand thread. The upper bolt 78 terminates in an eye 82 through which passes the shank 84 of a bolt 86. Bolt 86 passes through holes 88 in rods 18 and not only serves to hold bolt 78 in position but, when nut 90 is used, also holds the two rods 18 together. The lower bolt 80 terminates in and eye 92 through which passes the shank of bolt 94. Bolt 94 is used in conjunction with nut 96 to hold the lower bolt 80 in relation to a clamp 98 which passes around lower end rod 62.

Thus, if frame 68 is rotated in a clockwise direction the lower frame 12 is forced away from the upper frame 10, and if rotated in an anti-clockwise direction the lower frame 12 is drawn towards the upper frame 10.

So as to secure the end rods 32 and lower end rod 62 in relation to rods 18 and straight rod 52 respectively, each rod 18, 52 is provided with an external screw thread 106 at its inner end 20, 64 which receives a nut 100 (FIG. 3). The inner end of the nut 100 allows the passage therethrough of the end rod 32, 62 and is provided with an internal circlip 102. Furthermore, the inner, unthreaded surface 104 of nut 100 tapers radially inwardly in the axially inwardly direction. Thus, as nut 100 is tightened over thread 106, the circlip 102 contacts the end of rod 18, 52. Further tightening of nut 100 causes the circlip 102 to move along the tapered surface 104 until it is jammed between the end of rod 18, 52, the end rod 32, 62, and surface 104 of nut 100. In this way, the rods 32, 62 are held in position relative to rods 18, 52.

Thus, in use, each of the end rods 32, the lower end rod 62, and the link member 14 can be adjusted so that the entire mounting frame is securely attached to the vehicle.

FIG. 4 shows the mounting frame secured to a vehicle door 110. There are only two differences between this mounting frame and that of FIGS. 1 to 3—the lower end rod 62' is of greater length to allow for the greater height of the door 110, and the end plates 40' are different. In fact, the end plates 40' are merely the end plates 40 but in the reverse position-that is, the portion of the end plate 40 which was located in the flattened portion 36 becomes the vertical portion of the plate 40' adjacent the window glass 112. This is why second hole 41 is provided in plates 40.

As can be seen, due to its inherent symmetry, the one mounting frame can be used for either driver or passenger side operation and, furthermore, can receive a large range of different mirrors. Additionally, the mounting frame is readily and easily adjustable for a large variation in sizes of vehicles, mirrors and drivers.

If desired, the hook 66 at the end 64 of lower end rod 62 may be replaced by a suitable suction-cap mechanism. Naturally, the mirror 16 may be of any suitable nature such as, for example, electrically or cable operated remote controlled mirrors.

Whilst there has been described in the foregoing description a preferred construction of a frame member according to the present invention it will be understood by those skilled in the art that many variations and modifications in details of design or construction may be made without departing from the essential nature of the present invention as ascertained from the following claims.

I claim:

1. A mounting frame for mounting an external rear view mirror to a vehicle, said mounting frame comprising:
    (a) a substantially A-shaped upper frame having two identically shaped hollow rods in back-to-back relation such that the inner ends flare away from each other and their outer ends are joined; each of said hollow rods being provided with a sliding end rod which is a sliding fit within its associated hollow rod, and being provided with a tightening means for holding said end rod in a selected position; each end rod having at the end thereof remote from said hollow rod an attachment means for releasable attachment to the vehicle;
    (b) a lower frame extending downwardly from said upper frame, said lower frame comprising a straight rod having an upper end pivotally attached to said hollow rods adjacent the joined outer ends thereof, and a sliding lower end rod which is a sliding fit within said straight rod; said straight rod being provided with tightening means for holding said lower end rod in a selected position; and said lower end rod having a securing means at lower end thereof for attachment to said vehicle; and
    (c) an adjustable link joining said upper frame and said lower frame and being of variable length;
    said rear view mirror being attached to said mounting frame at the joined outer ends of said hollow rods.

2. A mounting frame as claimed in claim 1, wherein the tightening means provided on each of said hollow rods comprises an externally screw-threaded portion at the inner end of each of said rods for receiving a nut; said nut being about each of said sliding end rods and being adapted to engage said screw-threaded portion; said nut having a radially inwardly tapered bore and containing within a circlip; said circlip being jammed between the inner end of said hollow rod, said sliding end rod, and said tapered bore upon rotation of said nut to retain said sliding end rod in position relative to said straight rod.

3. A mounting frame as claimed in claim 1, wherein the tightening means provided on said straight rod comprises an externally screw-threaded portion at the lower end of said straight rod for receiving a nut; said nut being about said sliding lower end rod for engagement with said screw-threaded portion; said nut having a radially inwardly tapered bore and containing within a circlip; said circlip being jammed between the inner end of said rod, said sliding lower end rod, and said tapered bore upon rotation of said nut to retain said sliding lower end rod in position relative to said straight rod.

4. A mounting frame as claimed in claim 1, wherein said adjustable link comprises a hollow frame having a righthand internal thread at a first end and a left hand internal thread at a second end, said first end being adapted to receive the shank of a right-hand threaded bolt the head of which is attached to said upper frame, said second end being adapted to receive the shank of a left-hand threaded bolt the head of which is attached to said lower frame, the heads of both said right-hand threaded bolt and said left-hand threaded bolt having an eye therethrough, and the head of said left-hand threaded bolt being attached to a clamp located on said lower rod.

5. A mounting frame as claimed in claim 1, wherein each of said sliding end rods has at the inner end thereof a flattened portion, there being to each flattened portion an end plate for attachment to a vehicle.

6. A mounting frame as claimed in claim 5, wherein each of said end plates is reversible to enable said end plate to be used to mount said mounting frame on a front wheel fender of the vehicle when in a first position or to a front door of the vehicle when in a second position.

* * * * *